(12) United States Patent
Tani et al.

(10) Patent No.: US 6,926,976 B2
(45) Date of Patent: *Aug. 9, 2005

(54) MAGNETIC RECORDING MEDIUM COMPRISING A MAGNETIC LAYER HAVING SPECIFIC THICKNESS AND PROJECTIONS

(75) Inventors: Masakazu Tani, Nagaokakyo (JP); Yoshiyuki Makita, Kyoto-fu (JP); Norihisa Yoshimoto, Kyoto-fu (JP); Kenichiro Yoshida, Toyonaka (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/725,471

(22) Filed: Dec. 3, 2003

(65) Prior Publication Data

US 2004/0166374 A1 Aug. 26, 2004

Related U.S. Application Data

(62) Division of application No. 09/984,982, filed on Oct. 31, 2001, now Pat. No. 6,780,531.

(30) Foreign Application Priority Data

Oct. 31, 2000 (JP) ........................................ 2000-333928

(51) Int. Cl.$^7$ ............................................... G11B 5/68
(52) U.S. Cl. ........................ 428/694 BB; 428/694 BP; 428/694 BR; 428/900
(58) Field of Search ................... 428/694 BB, 694 BR, 428/694 BP, 900

(56) References Cited

U.S. PATENT DOCUMENTS

| | | | |
|---|---|---|---|
| 5,009,929 A | 4/1991 | Iida et al. | |
| 5,169,703 A | 12/1992 | Mitazaki et al. | |
| 5,512,350 A | 4/1996 | Ryoke et al. | |
| 5,718,964 A | 2/1998 | Naoe et al. | |
| 5,721,010 A | 2/1998 | Hinoki et al. | |
| 5,827,599 A | 10/1998 | Murao et al. | |
| 5,976,714 A | 11/1999 | Arita et al. | |
| 6,017,605 A | 1/2000 | Yamazaki et al. | |
| 6,251,509 B1 | 6/2001 | Kawamata et al. | |
| 6,780,531 B2 * | 8/2004 | Tani et al. | 428/694 BR |

FOREIGN PATENT DOCUMENTS

| | | |
|---|---|---|
| JP | 63-259830 | 10/1988 |
| JP | 1-201824 | 8/1989 |
| JP | 2-265016 | 10/1990 |
| JP | 4-69812 | 3/1992 |
| JP | 5-73883 | 3/1993 |
| JP | 6-103562 A | 4/1994 |
| JP | 6-180835 | 6/1994 |
| JP | 6-309663 A | 11/1994 |
| JP | 6-342515 | 12/1994 |
| JP | 7-296360 A | 11/1995 |

(Continued)

*Primary Examiner*—H. Thile
(74) *Attorney, Agent, or Firm*—Birch, Stewart, Kolasch & Birch, LLP

(57) ABSTRACT

A magnetic recording medium comprising a non-magnetic support, at least one primer layer formed on one surface of the non-magnetic support, a magnetic layer formed on the primer layer, and a backcoat layer formed on the other surface of the non-magnetic support, wherein the magnetic layer has a thickness of 0.30 $\mu$m or less and a centerline average surface roughness Ra of 3.2 nm or less, and $(P_1-P_0)$ is 30 nm or less and $(P_1-P_{20})$ is 5 nm or less in which $P_0$ is an averaged height of projections of the magnetic layer, and $P_1$, $P_2$, - - - and $P_{20}$ are heights of the highest, the second highest, - - - and the 20th highest projections of the magnetic layer, respectively.

5 Claims, 3 Drawing Sheets

FOREIGN PATENT DOCUMENTS

| | | |
|---|---|---|
| JP | 7-296374 A | 11/1995 |
| JP | 8-336941 A | 12/1996 |
| JP | 9-63043 A | 3/1997 |
| JP | 10-3651 A | 1/1998 |
| JP | 11-66544 A | 3/1999 |
| JP | 11-175951 A | 7/1999 |
| JP | 11-238225 | 8/1999 |
| JP | 11-353634 | 12/1999 |
| JP | 2000-11368 A | 1/2000 |
| JP | 2000-40218 | 2/2000 |
| JP | 2000-90430 A | 3/2000 |
| JP | 2000-99940 A | 4/2000 |
| JP | 2000-149242 A | 5/2000 |

* cited by examiner

US 6,926,976 B2

MAGNETIC RECORDING MEDIUM COMPRISING A MAGNETIC LAYER HAVING SPECIFIC THICKNESS AND PROJECTIONS

This application is a Divisional of Application Ser. No. 09/984,982, filed on Oct. 31, 2001 now U.S. Pat. No. 6,780,531, the entire contents of which are hereby incorporated by reference and for which priority is claimed under 35 U.S.C. § 120; and this application claims priority of Application No. 333928/2000 filed in Japan on Oct. 31, 2000 under 35 U.S.C. § 119.

BACKGROUND OF THE INVENTION

1. Field of the Invention

The present invention relates to a magnetic recording medium having a high recording capacity, a high access speed and a high transmission speed. In particular, the present invention relates to a magnetic recording medium for data-backup, which records and reads data with a reading head comprising a magnetoresistance element (hereinafter referred to as "MR head").

2. Prior Art

Magnetic tapes have various applications such as audio tapes, videotapes, computer tapes, etc. In particular, in the field of magnetic tapes for data-backup, a tape having a memory capacity of several ten GB or more per one reel is commercialized with the increase of the capacity of hard discs to be back-upped. Therefore, it is inevitable to increase the capacity of the tapes for data-backup. It is also necessary to increase the traveling speed of a tape and a relative speed between the tape and a head to increase an access speed and a transfer speed.

To increase the capacity of a tape for data-backup per one reel, it is necessary to increase a recording density in a width direction with decreasing a track width (a signal pattern width on the tape) to 15 µm or less in addition to the prolongation of a tape length per one reel with decreasing the thickness of the tape and the reduction of thickness demagnetization and thus the decrease of a recording wavelength with reducing the thickness of a magnetic layer to 0.3 µm or less.

When the thickness of the magnetic layer is reduced to 0.3 µm or less, the durability of the magnetic recording media tend to deteriorate. Therefore, at least one primer layer is provided between a non-magnetic support and the magnetic layer. When the recording wavelength is shortened, the influence of spacing loss between the magnetic layer and the magnetic head increases. Thus, if the magnetic layer has large projections, a half width value of output peak (hereinafter referred to as "PW50") may increase or the output may decrease due to the spacing loss so that an error rate may increase.

Since a leaking magnetic flux from the magnetic recording medium decreases when the recording density in the width direction is increased with decreasing the track width to 15 µm or less, a MR head, which can achieve a high output even at a minute magnetic flux, is used as a reading head.

Examples of the magnetic recording media used with the MR head are disclosed in JP-A-11-238225, JP-A-2000-40217 and JP-A-2000-40218. In these publications, the skew of output from the MR head is prevented with controlling the magnetic flux of the magnetic recording medium (a product of a residual magnetic flux density and a thickness), or the thermal asperity of the MR head is suppressed with reducing dents on the surface of the magnetic layer to a specific value or less.

The conventional magnetic head uses a chip itself, which is a laminate of a magnetic induction type head for recording and a magnetic induction type head for reading. On the other hand, the MR head 20 is combined with the magnetic induction type head 21 for recording and embedded in the slider 22, as schematically shown in FIGS. 2, 2a, 3 and 3a. In FIGS. 2a and 3a, numeral 20a stands for the MR element, 21a and 21b for magnetic elements composing the recording head 21, 21c for a reading gap, and 23 for a shielding member. The MR head is embedded with receding from the slider surface 22a by about 25 nm.

That is, the conventional head consists of a very small chip, and thus the magnetic tape runs over the head as if a knife edge bites the tape, while, in the case of the MR head, the magnetic tape 30 runs with contacting to the slider 22, since the MR head 20 is embedded in the large slider 22 with receding from the slider surface (as shown in FIGS. 2, 2a, 3 and 3a). The magnetic tape 30 and the MR head 20 are in contact with each other as if the magnetic tape 30 expands towards the MR head 20. Since the contacting state of the MR head with the magnetic tape is very different from that of the conventional magnetic head, properties required for the magnetic tape change completely in connection with the decrease of the spacing loss.

Furthermore, since the MR element 20a of the MR head 20 comprises a very thin film, it is easily worn out. As shown in FIGS. 2a and 3a, usually a pair of the MR head 20 and the recording head 21 are used so that the magnetic tape can be recorded and read when it runs either in a forward direction or in a backward direction. Furthermore, a plurality of pairs of the MR head and the recording head are provided as shown in FIG. 2 so that a plurality of tracks can be recorded and read at the same time.

In addition, since the MR head has a very narrow track width, a servo-signal is provided for the tracking servo of the MR head.

The track servo system includes a magnetic servo system and an optical servo system. The former system magnetically records a servo-band in the magnetic layer and reads the servo-band to carry out servotracking, while the latter system forms a servo-band comprising depression arrays with laser irradiation, etc. and optically reads the servo-band to carry out the servotracking. Besides the above systems, the magnetic servo system includes a system in which magnetism is imparted to the backcoat layer, and a magnetic serve-signal is recorded in the backcoat layer, and the optical servo system includes a system in which an optical servo signal is recorded in a backcoat layer with a material that absorbs light.

To keep up with the increase of the traveling speed of the magnetic tape and the relative speed between the tape and the head, it is necessary to travel the tape at a high speed while tracing the servo-signal. However, if a coefficient of friction of the magnetic layer or the backcoat layer against a slider material (for example, alumina/titania/carbide, etc.) or a material of guide rollers is insufficiently optimized, the magnetic tape meanders so that the tracking may deviate (off-track), PW50 may increase or the output may decrease. Therefore, the error rate may increase.

SUMMARY OF THE INVENTION

One object of the present invention is to provide a magnetic recording medium which can decrease the spacing loss of the medium to be used with the MR head, and reduce the error rate through the suppression of the off-track caused by the meandering of the medium.

Another object of the present invention is to provide a magnetic recording medium which can reduce the wearing of the MR head to be used in combination with the magnetic recording medium.

To achieve the above objects, extensive research has been done. As a result, it has been found that, when a difference of the height of the highest projection ($P_1$) and the averaged height of the projections ($P_0$) ($P_1$–$P_0$) is smaller than a specific value, and the difference of the height of the highest projection ($P_1$) and the height of the 20th highest projection $P_{20}$ ($P_1$–$P_{20}$) is also smaller than a specific value, a spacing loss is decreased, and further that, when a ratio of $\mu_{mSL}$ to $\mu_{mSUS}$ [($\mu_{mSL}$)/($\mu_{mSUS}$)] and a ratio of $\mu_{mSL}$ to $\mu_{BSUS}$ [($\mu_{mSL}$)/($\mu_{BSUS}$)], wherein $\mu_{mSL}$ is a coefficient of kinetic friction (hereinafter referred to as "coefficient of friction") between a magnetic layer and a slider material (e.g. alumina/titania/carbide), $\mu_{mSUS}$ is a coefficient of friction between the magnetic layer and a stainless steel (SUS304) (hereinafter referred to as "SUS"), and $\mu_{BSUS}$ is a coefficient of friction between the backcoat layer and SUS, are controlled to specific values, the off-track caused by the meandering of the magnetic tape is suppressed and thus an error rate is improved. The effect to improve the error rate through the decrease of the off-track is particularly remarkable when the track width is 15 μm or less.

The present invention has been completed based on the above findings.

Accordingly, the above objects are achieved by a magnetic recording medium comprising a non-magnetic support, at least one primer layer formed on one surface of the non-magnetic support, a magnetic layer formed on the primer layer, and a backcoat layer formed on the other surface of the non-magnetic support, wherein the magnetic layer has a thickness of 0.30 μm or less and a centerline average surface roughness Ra of 3.2 nm or less, and ($P_1$–$P_0$) is 30 nm or less and ($P_1$–$P_{20}$) is 5 nm or less in which $P_0$ is an averaged height of projections of the magnetic layer, and $P_1$, $P_2$, - - - and $P_{20}$ are heights of the highest, the second highest, - - - and the 20th highest projections of the magnetic layer, respectively.

The magnetic recording medium of the present invention is preferably used in applications where magnetically recorded signals are read with a reading head comprising a magneto-resistatance element.

In one preferred embodiment of the present invention, a ratio of $\mu_{mSL}$ to $\mu_{mSUS}$ [($\mu_{mSL}$)/($\mu_{mSUS}$)] is from 0.7 to 1.3 and a ratio of $\mu_{mSL}$ to $\mu_{BSUS}$ [($\mu_{mSL}$)/($\mu_{BSUS}$)] is from 0.8 to 1.5, wherein $\mu_{mSL}$ is a coefficient of friction between the magnetic layer and a slider material, $\mu_{mSUS}$ is a coefficient of friction between the magnetic layer and SUS, and $\mu_{BSUS}$ is a coefficient of friction between the backcoat layer and SUS.

In another preferred embodiment of the present invention, the magnetic layer has a coercive force of 120 to 320 kA/m, and a product of a residual magnetic flux density in the machine direction of the magnetic layer and the thickness of the magnetic layer is from 0.0018 μTm to 0.06 μTm.

In a further preferred embodiment of the present invention, the backcoat layer contains small particle size carbon black having a particle size of 5 to 100 nm and large particle size carbon black having a particle size of 200 to 400 nm in a total amount of 60 to 98% by weight based on the weight of inorganic powders in the backcoat layer and iron oxide particles having a particle size of 0.1 to 0.6 μm in an amount of 2 to 40% by weight based on the weight of inorganic powders in the backcoat layer, and has a centerline average surface roughness Ra of 2 to 15 nm.

In a yet further preferred embodiment of the present invention, the non-magnetic support has a thickness of 7.0 μm or less, a Young's modulus in the machine direction of at least 6.08 GPa (at least 600 kg/mm$^2$), and a ratio of a Young's modulus MD in the machine direction to a Young's modulus TD in the transverse direction (MD/TD) is from 0.6 to 1.80.

The coefficient of friction used herein means a coefficient of kinetic friction, and the measurement method thereof will be explained in detail in below described Examples.

DETAILED DESCRIPTION OF THE INVENTION

Figure 1:
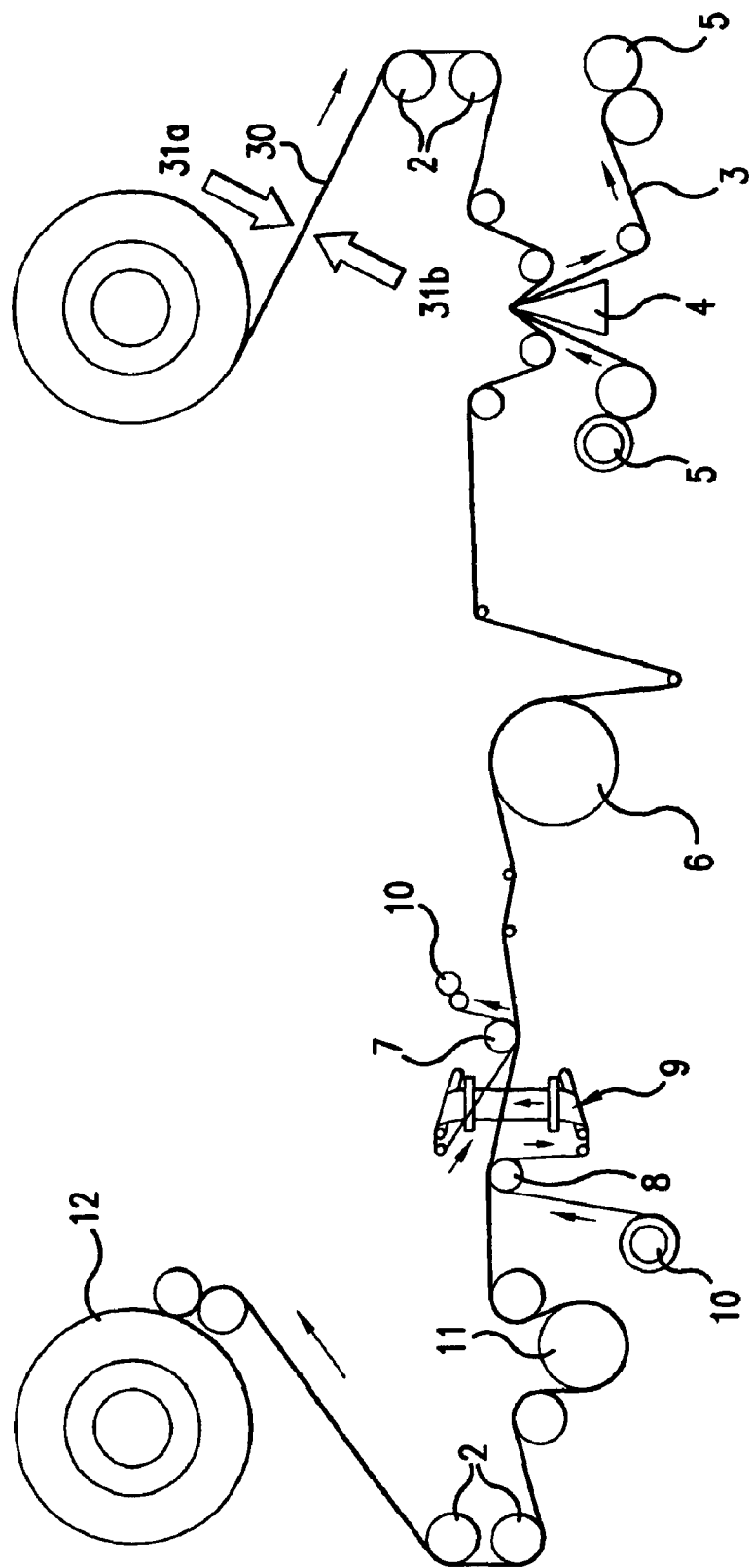
FIG. 1 schematically shows one embodiment of a LRT (lapping/rotary/tissue) treatment carried out in the production of the magnetic recording medium of the present invention.
Figure 2A:
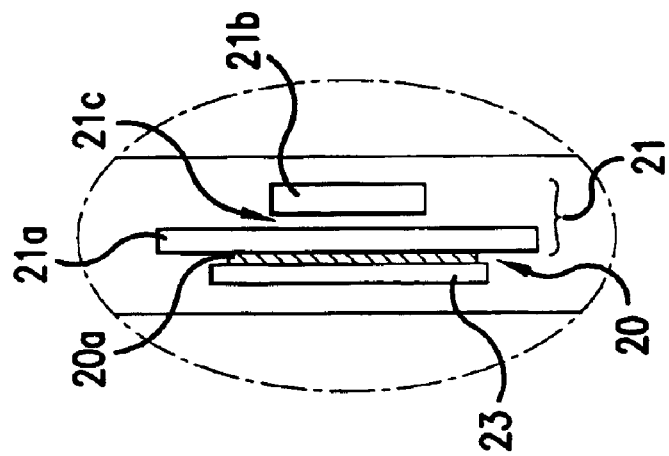
FIG. 2a is a blowup of a portion of FIG. 2.
Figure 2:
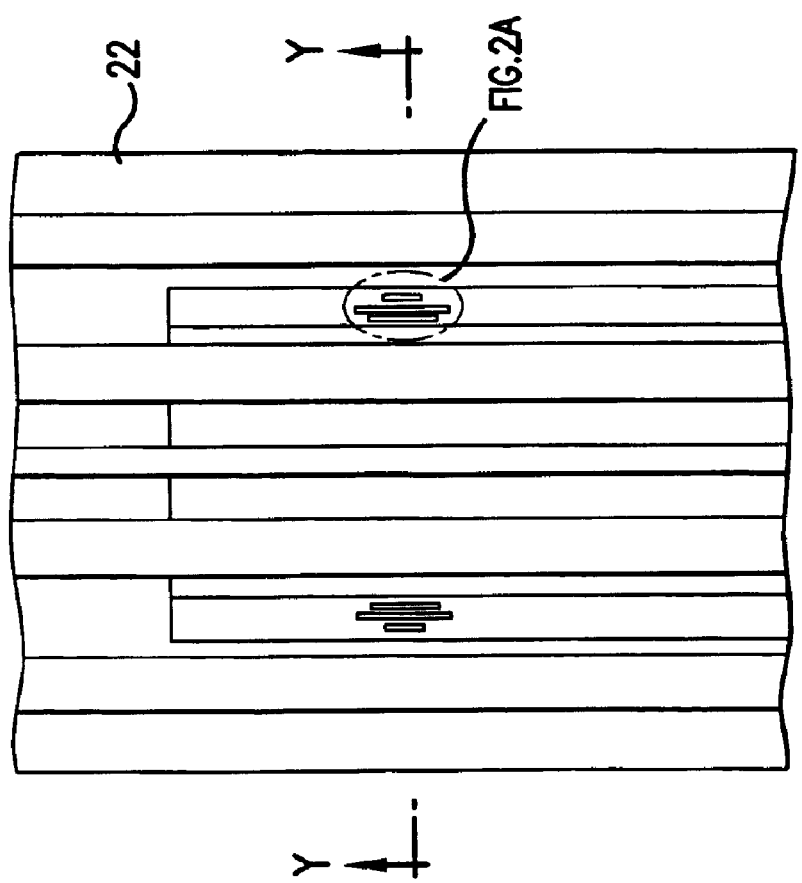
FIG. 2 is a schematic cross section of a recording head and a MR head for reading, which are mounted on a slider.
Figure 3A:
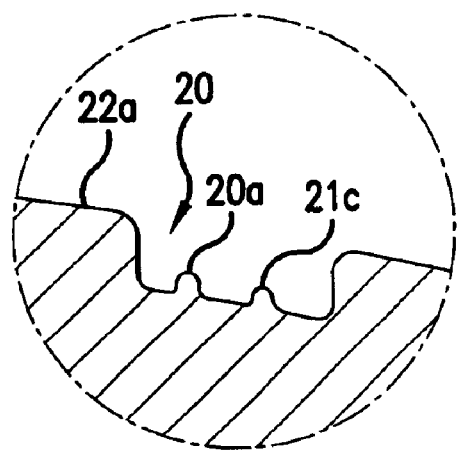
FIG. 3a is a blowup of a portion of FIG. 3.
Figure 3:
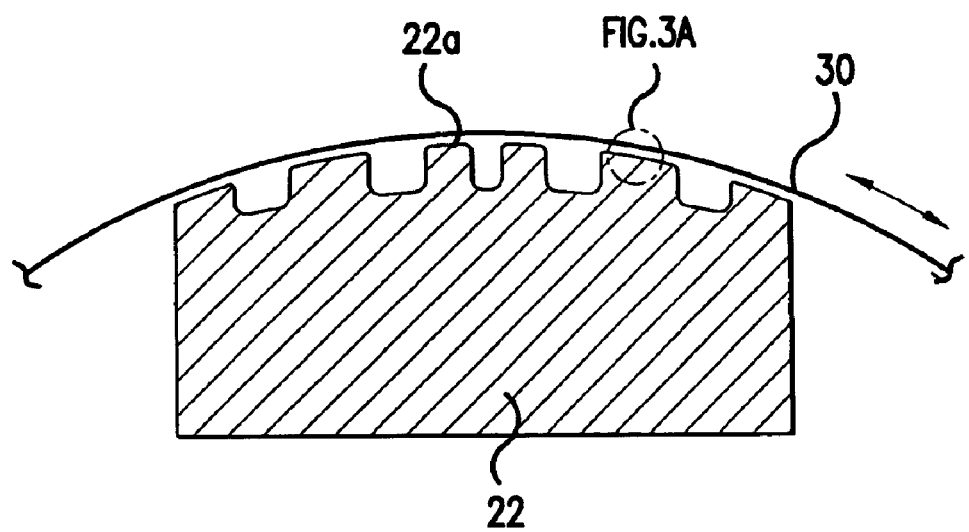
FIG. 3 is a schematic cross section along the Y—Y line of FIG. 2.

The magnetic recording medium of the present invention has a magnetic layer with a thickness of 0.3 μm or less. Since the thickness of the magnetic layer is so small and thus the thickness loss is low, the magnetic recording medium of the present invention has a high recording density in the running direction of the magnetic head.

The thickness of the magnetic layer is preferably from 0.01 to 0.3 μm, more preferably from 0.01 to 0.25 μm, particularly preferably from 0.01 to 0.2 μm, most preferably from 0.01 to 0.15 μm. When the thickness of the magnetic layer exceeds 0.3 μm, the reading output decreases due to the thickness loss. When the thickness of the magnetic layer is less than 0.01 μm, it may be difficult to form a uniform magnetic layer.

The centerline average surface roughness Ra of the magnetic layer is usually 3.2 nm or less, preferably from 0.5 to 3.2 nm, more preferably from 0.7 to 2.9 nm, particularly preferably from 0.7 to 2.5 nm. When Ra exceeds 3.2 nm, PW50 increases or the output decreases due to the increase of the spacing loss so that the error rate increases. When Ra is less than 0.5 nm, the traveling of the magnetic medium becomes less stable.

In the magnetic recording medium of the present invention, ($P_1$–$P_0$) is 30 nm or less, preferably from 5 to 30 nm, more preferably from 5 to 25 nm, most preferably from 5 to 20 nm, wherein $P_0$ is an averaged height of projections of the magnetic layer, and $P_1$ is the height of the highest projections of the magnetic layer.

When ($P_1$–$P_0$) exceeds 30 nm, PW50 increases or the output decreases due to the increase of the spacing loss so that the error rate increases. When ($P_1$–$P_0$) is 30 nm or less, the thermal asperity caused by the collision of the medium against the MR head can be effectively reduced. When ($P_1$–$P_0$) is less than 5 nm, the traveling of the magnetic medium becomes less stable.

In addition to ($P_1$–$P_0$) satisfying the above requirement, ($P_1$–$P_{20}$) is 5 nm or less, preferably 1.8 nm or less, more preferably 1.5 nm or less, particularly preferably 1.0 nm or less, wherein $P_1$ is the height of the highest projection, and $P_1$, $P_2$, $P_3$, $P_4$, $P_5$ - - - and $P_{20}$ are heights of the second highest, the third highest, the fourth highest, the fifth highest, - - - and the 20th highest projections of the magnetic layer.

When ($P_1-P_0$) is 5 nm or less, preferably 1.8 nm or less, the contact between the magnetic tape and the MR head is improved, since the magnetic tape can be in uniform contact with the MR head which is embedded in the slider (AlTiC: alumina/titania/carbide) with receding from the slider surface by about 25 nm, and thus PW50 decreases and the output increases. Therefore, the error rate is reduced.

When the magnetic layer has the projections which satisfy the above two conditions, the coefficient of friction decreases, and also the sticking (or catch) of the magnetic recording medium with the MR slider (alumina/titania/carbide) is suppressed so that the smooth traveling of the medium is achieved.

The magnetic tape to be used in combination with the MR head embedded in the slider, the ratio of ($P_1-P_0$) to Ra [($P_1-P_0$)/Ra] is preferably 12 or less, more preferably 10 or less, particularly 8 or less, most preferably 6 or less. When ($P_1-P_0$)/Ra is less than 12, the MR head and the magnetic tape are in uniform contact with each other so that the PW50 is made small and the output is maintained high, and therefore the error rate is reduced, even when the MR element is worn. Such a magnetic tape can be produced with controlling the treatment conditions in the lapping/ rotary/ tissue (LRT) treatment applied to the magnetic layer.

When the ratio of $\mu$mSL to $\mu_{mSUS}$ [($\mu_{mSL}$)/($\mu_{mSUS}$)] is from 0.7 to 1.3 and the ratio of $\mu_{mSL}$ to $\mu_{BSUS}$ [($\mu_{mSL}$)/($\mu_{BSUS}$)] is from 0.8 to 1.5, wherein $\mu_{mSL}$ is a coefficient of friction between the magnetic layer and a slider material (e.g. alumina/titania/carbide), $\mu_{mSUS}$ is a coefficient of friction between the magnetic layer and SUS, and $\mu_{BSUS}$ is a coefficient of friction between the backcoat layer and SUS, the off-track due to the meandering of the magnetic tape is suppressed and the error rate is improved. This effect is remarkable when the track width is 5 $\mu$m or less. Preferably, ($\mu_{mSL}$)/($\mu_{BSUS}$) is from 0.85 to 1.15 and ($\mu_{mSL}$)/($\mu_{BSUS}$) is from 1.0 to 1.3, more preferably ($\mu_{mSL}$)/($\mu_{BSUS}$) is from 0.9 to 1.1 and ($\mu_{mSL}$)/($\mu_{BSUS}$) is from 1.0 to 1.3.

Such a magnetic tape can be produced by (1) adding an ester of a higher fatty acid and also a fatty acid amide to the magnetic layer or decreasing the amount of a crosslinking agent in the magnetic layer to improve the properties of the magnetic layer, (2) adding small particle size carbon black having a particle size of 5 to 200 nm and large particle size carbon black having a particle size of 300 to 400 nm to the backcoat layer, and (3) treating the magnetic layer with the above LRT treatment.

The coercive force of the magnetic layer is preferably from 120 to 320 kA/m, more preferably from 140 to 320 kA/m, particularly preferably from 160 to 320 kA/m. When the coercive force is less than 120 kA/m, the output may decrease because of the demagnetizing field demagnetization as the recording wavelength decreases. When the coercive force exceeds 320 kA/m, it may be difficult to record the magnetic recording medium with the magnetic head.

The product of the residual magnetic flux density in the machine direction of the magnetic layer and the thickness of the magnetic layer is preferably from 0.0018 $\mu$Tm to 0.06 $\mu$Tm, more preferably from 0.0036 to 0.050 $\mu$Tm, particularly preferably from 0.004 to 0.045 $\mu$Tm, most preferably from 0.004 to 0.040 $\mu$Tm. When this product is less than 0.0018 $\mu$Tm, the reading output with the MR head is small. When this product exceeds 0.06 $\mu$Tm, the reading output with the MR head tends to be skewed. The magnetic recording medium comprising such a magnetic layer can decrease the recording wavelength, and increase the reading output when the medium is read with the MR head. In addition, the skew of the reading output can be suppressed so that an output to noise ratio can be increased.

The thickness of the primer layer is preferably from 0.3 to 3.0 $\mu$m, more preferably from 0.5 to 2.5 $\mu$m, particularly preferably from 0.5 to 2.0 $\mu$m, most preferably from 0.5 to 1.5 $\mu$m. When the thickness of the primer layer is less than 0.3 $\mu$m, the durability of the magnetic recording medium may deteriorate in some cases. When the thickness of the primer layer exceeds 3.0 $\mu$m, the effect to increase the durability of the magnetic recording medium is saturated. Furthermore, in the case of the magnetic tape, since the total thickness of the magnetic tape increases, the length of the tape per one reel decreases and thus the recording capacity tends to decrease.

The thickness of the backcoat layer is preferably from 0.2 to 0.8 $\mu$m. When the thickness of the backcoat layer is less than 0.2 $\mu$m, the traveling properties of the magnetic recording medium tend to deteriorate. When the thickness of the backcoat layer exceeds 0.8 $\mu$m, the total thickness of the magnetic recording medium increases so that the length of the tape per one reel decreases and thus the recording capacity tends to decrease.

The centerline average surface roughness Ra of the backcoat layer is preferably from 2 to 15 nm, more preferably from 3 to 8 nm. When Ra of the backcoat layer is less than 2 nm, the traveling of the magnetic recording medium tends to become unstable. When Ra of the backcoat exceeds 15 nm, the surface roughness of the magnetic layer may increase due to the back-transfer of the surface roughness from the backcoat layer to the magnetic layer so that the spacing loss may increase.

Such a backcoat layer can be formed when it contains small particle size carbon black having a particle size of 5 to 100 nm and large particle size carbon black having a particle size of 300 to 400 nm in a total amount of 60 to 98% by weight based on the weight of inorganic powders in the backcoat layer, and iron oxide particles having a particle size of 0.1 to 0.6 $\mu$m in an amount of 2 to 40% by weight based on the weight of inorganic powders in the backcoat layer and it is calendered. The amount of the large particle size carbon black is usually 5 to 15% by weight of the small particle size carbon black.

Hereinafter, the preferred elements of the magnetic recording medium according to the present invention will be explained.

Non-magnetic Support:

The thickness of the non-magnetic support is preferably 7.0 $\mu$m or less, more preferably from 2.0 to 7.0 $\mu$m, particularly preferably from 2 to 6.5 $\mu$m, most preferably from 2.5 to 6.0 $\mu$m. When the thickness of the non-magnetic support is less than 2 $\mu$m, it is difficult to form such a thin support. Furthermore, the strength of the magnetic recording medium decreases. When the thickness of the non-magnetic support exceeds 7.0 $\mu$m, the total thickness of the magnetic tape increases so that the recording capacity per one reel decreases.

The Young's modulus of the non-magnetic support in the machine direction depends on the thickness of the support, and is usually at least 5.07 GPa (500 kg/mm$^2$), preferably at least 6.08 GPa (600 kg/mm$^2$), more preferably at least 7.09

GPa (700 kg/mm$^2$). When the thickness of the support is 5.0 μm or less, this Young's modulus is preferably at least 10.13 GPa (1,000 kg/mm$^2$). When this Young's modulus is less than 6.08 GPa, the strength of the magnetic tape may decrease or the traveling of the magnetic tape may become unstable.

When a ratio of a Young's modulus MD in the machine direction to a Young's modulus TD in the transverse direction (MD/TD) of the non-magnetic support is from 0.6 to 1.8, the contact of the magnetic recording medium with the MR head is improved. A preferred range of the MD/TD ratio is different between a helical scan type medium and a linear recording type medium. In the case of the helical scan type medium, the MD/TD ratio is preferably from 0.6 to 1.2, more preferably from 0.6 to 1.0, particularly preferably from 0.60 to 0.80. In the case of the linear recording type medium, the MD/TD ratio is preferably from 1.0 to 1.8, more preferably from 1.1 to 1.7, particularly preferably from 1.2 to 1.6. In these ranges, the head touch is improved.

Examples of such a non-magnetic recording medium include a polyethylene naphthalate film, an aromatic polyamide film, an aromatic polyimide film, etc.

Primer Layer:

As described above, the thickness of the primer layer is preferably from 0.3 to 3.0 μm, more preferably from 0.5 to 2.5 μm, particularly preferably from 0.5 to 2.0 μm, most preferably from 0.5 to 1.5 μm. When the thickness of the primer layer is less than 0.3 μm, the durability of the magnetic recording medium may deteriorate. When the thickness of the primer layer exceeds 3.0 μm, the effect to improve the durability of the magnetic recording medium is saturated. Furthermore, in the case of a magnetic tape, the total thickness of the magnetic tape increases, the length of the tape per one reel decreases and thus the recording capacity tends to decrease.

The primer layer may contain carbon black to improve the conductivity, or non-magnetic particles to control the viscosity of a paint and the stiffness of the magnetic tape.

Examples of the non-magnetic particles to be contained in the primer layer include titanium oxide, iron oxide, alumina, etc. Among them, iron oxide, or a mixture of iron oxide and alumina is preferable.

The surface roughness of the magnetic layer, which is formed on the primer layer by a wet-on-wet method, can be reduced, when the primer layer contains 15 to 35% by weight of carbon black having a particle size of 10 to 100 nm, 35 to 83% by weight of non-magnetic iron oxide having a major axis length of 0.05 to 0.20 μm and a minor axis length of 5 to 200 nm, and optionally 0 to 20% by weight of alumina having a particle size of 10 to 100 nm, based on the total weight of inorganic particles contained in the primer layer.

In general, the non-magnetic iron oxide has a needle shape. When particulate or amorphous non-magnetic iron oxide is used, its particle size is preferably from 5 to 200 nm.

The present invention does not exclude the addition of large size carbon black having a particle size of 100 nm or large, provided that the surface smoothness is not impaired. In this case, the total amount of the small size carbon black and the large size carbon black is preferably within the above range. In general, the amount of the large size carbon black is 20% by weight or less of the whole carbon black.

Examples of carbon black to be added to the primer layer are acetylene black, furnace black, thermal black, etc. Such carbon black usually has a particle size of 5 to 100 nm, preferably 10 to 100 nm. When the particle size of carbon black is less than 10 nm, it may be difficult to disperse the carbon black particles in the primer layer since carbon black has a structure. When the particle size of carbon black exceeds 100 nm, the surface smoothness of the primer layer deteriorates.

The amount of carbon black to be contained in the primer layer may depend on the particle size of carbon black, and is preferably from 15 to 35% by weight. When the amount of carbon black is less than 15% by weight, the conductivity may not be sufficiently increased. When the amount of carbon black exceeds 35% by weight, the effects of the addition of carbon black may saturate. More preferably, carbon black having a particle size of 15 to 80 nm is used in an amount of 15 to 35% by weight, and particularly preferably, carbon black having a particle size of 20 to 50 nm is used in an amount of 20 to 30% by weight. When carbon black having the above particle size is used in the above-defined amount, the electrical resistance of the magnetic recording medium is decreased and the traveling irregularity is suppressed.

The non-magnetic iron oxide to be added to the primer layer preferably has a major axis length of 0.05 to 0.20 μm and a minor axis length (particle diameter) of 5 to 200 nm in the case of the needle-shape particles, or a particle size of 5 to 200 nm, more preferably 0.05 to 150 nm, particularly preferably 0.05 to 100 nm in the case of the particulate or amorphous shape particles. In particular, the needle-shape shape iron oxide particles are preferable, since the orientation of the magnetic layer can be improved. The amount of the non-magnetic iron oxide to be added to the primer layer is preferably from 35 to 83% by weight, more preferably from 40 to 80% by weight, particularly preferably from 50 to 75% by weight. When the particle size of the non-magnetic iron oxide is less than 5 nm, the iron oxide particles may not be uniformly dispersed. When the particle size exceeds 200 nm, the unevenness of the interface between the primer layer and the magnetic layer may be worsened. When the amount of the non-magnetic iron oxide is less than 35% by weight, the effect to increase the strength of the primer layer is small. When the amount of the iron oxide exceeds 83% by weight, the strength of the primer layer may rather decrease.

The primer layer may contain alumina in addition to iron oxide. The particle size of alumina is preferably from 10 to 100 nm, more preferably from 20 to 100 nm, particularly preferably from 30 to 100 nm. When the particle size of alumina is less than 10 nm, the alumina particles may not be uniformly dispersed in the primer layer. When the particle size of alumina exceeds 100 nm, the unevenness of the interface between the primer layer and the magnetic layer may be worsened. The amount of alumina to be added to the primer layer is usually from 0 to 20% by weight, preferably from 2 to 10% by weight, more preferably from 4 to 8% by weight.

Lubricant:

Coating layers including the primer layer and the magnetic layer may contain lubricants having different functions. Preferably, the coefficient of friction of the magnetic tape against the head and guide rollers of the traveling system can be decreased when the primer layer contains 0.5 to 4.0% by weight of a higher fatty acid and 0.2 to 3.0% by weight of a higher fatty acid ester, based on the weight of the entire powder components in the primer layer. When the amount of the higher fatty acid is less than 0.5% by weight, the effect to decrease the coefficient of friction is insufficient.

When the amount of the higher fatty acid exceeds 4.0% by weight, the primer layer may be plasticized and thus the toughness of the primer layer may be lost. When the amount of the higher fatty acid ester is less than 0.5% by weight, the effect to decrease the coefficient of friction is insufficient. When the amount of the higher fatty acid ester exceeds 3.0% by weight, an amount of the higher fatty acid ester which migrates to the magnetic layer may become large so that the magnetic tape may stick to the head and guide rollers of the traveling system.

The coefficient of friction of the magnetic tape against a capstan of the traveling system and the slider of the MR head can be decreased, when the magnetic layer contains 0.2 to 3.0% by weight of a fatty acid amide and 0.2 to 3.0% by weight of a higher fatty acid ester, based on the weight of the ferromagnetic powder. When the amount of the fatty acid amide is less than 0.2% by weight, the coefficient of friction between the head slider and the magnetic layer tends to increase. When the amount of the fatty acid amide exceeds 3.0% by weight, the fatty acid amide may bleed out and cause defects such as dropout.

As the fatty acid, higher fatty acids such as lauric acid, myristic acid, palmitic acid, stearic acid, behenic acid, oleic acid, linoleic acid, etc. can be used. As the fatty acid ester, butyl stearate, octyl stearate, amyl stearate, isooctyl stearate, octyl myristate, butoxyethyl stearate, anhydrous sorbitan monostearate, anhydrous sorbitan distearate, anhydrous sorbitan tristearate, etc. can be used. As the fatty acid amide, the amides of the above-exemplified higher fatty acids can be used.

When the amount of the higher fatty acid ester to be added is less than 0.2% by weight, the effect to decrease the coefficient of friction is insufficient. When the amount of the higher fatty acid ester exceeds 3.0% by weight, the magnetic tape may stick to the head and guide rollers of the traveling system.

The intermigration of the lubricants between the magnetic layer and the primer layer is not excluded.

The coefficient of friction between the magnetic tape and the slider of the MR head is preferably 0.30 or less, more preferably 0.25 or less. When this coefficient of friction exceeds 0.30, the spacing loss tends to arise due to the contamination of the slider. The coefficient of friction of less than 0.10 is hardly realized.

The coefficient of friction between the magnetic layer and SUS is preferably from 0.10 to 0.25, more preferably from 0.12 to 0.20. When this coefficient of friction is less than 0.10, the magnetic tape tends to slip on the head and the guide rollers so that the traveling of the tape may become unstable. When this coefficient of friction exceeds 0.25, the head and the guide rollers may easily be contaminated.

The ratio of $\mu_{mSL}$ to $\mu_{mSUS}$ [$(\mu_{mSL})/(\mu_{mSUS})$] is usually from 0.7 to 1.3, preferably from 0.8 to 1.2. In this preferred range, the off-track due to the meandering of the magnetic tape can be suppressed.

Magnetic Layer:

The thickness of the magnetic layer is described in the above.

When the thickness of the magnetic layer is less than 0.01 $\mu$m, it is difficult to form a uniform magnetic layer. When the thickness of the magnetic layer exceeds 0.3 $\mu$m, the reading output may decrease due to the thickness loss, or the product (Brδ) of the residualmagnetic fluxdensity (Br) and the thickness (δ) becomes too large so that the reading output tends to be skewed due to the saturation of the MR head.

The coercive force of the magnetic layer is also explained in the above. When the coercive force of the magnetic layer is less than 120 kA/m, the output is decreased by the demagnetizing field demagnetization when the recording wavelength is shortened. When the coercive force exceeds 320 kA/m, the recording with the magnetic head may become difficult.

The product of the residual magnetic flux density in the machine direction and the thickness of the magnetic layer is explained in the above. When this product is less than 0.0018 $\mu$Tm, the reading output with the MR head may be low. When this product exceeds 0.06 $\mu$Tm, the reading output with the MR head tends to be skewed.

As the magnetic powder to be added to the magnetic layer, ferromagnetic iron metal powder, hexagonal barium ferrite powder, etc. may be used. The coercive force of the ferromagnetic iron metal powder and hexagonal barium ferrite powder is preferably from 120 to 320 kA/m. The saturation magnetization is preferably from 120 to 200 A·m$^2$/kg (120 to 200 emu/g), more preferably from 130 to 180 A·m$^2$/kg (130 to 180 emu/g) in the case of the ferromagnetic iron metal powder, or preferably from 50 to 70 A·m$^2$/kg (50 to 70 emu/g) in the case of the hexagonal barium ferrite powder. The magnetic characteristics of the magnetic layer and the ferromagnetic powder are measured with a sample-vibration type fluxmeter under an external magnetic field of 1.28 MA/m (16 kOe).

An average major axis length of the ferromagnetic iron metal powder to be used in the magnetic recording medium of the present invention is preferably from 0.03 to 0.2 $\mu$m, more preferably from 0.03 to 0.18 $\mu$m, particularly preferably from 0.04 to 0.15 $\mu$m. When the average major axis length is less than 0.03 $\mu$m, the dispersion of the powder in the paint is difficult since the agglomeration force of the magnetic powder increases. When the average major axis length exceeds 0.2 $\mu$m, the coercive force decreases, or the particle noise due to the particle size increases. For the same reason, the plate size of the hexagonal barium ferrite powder is preferably from 5 to 200 nm.

The average major axis length and the particle size are obtained by actually measuring the particle sizes in a photograph taken with a scanning electron microscope (SEM) and averaging the measured values of 100 particles.

The BET specific surface area of the ferromagnetic iron metal powder is preferably at least 35 m$^2$/g, more preferably at least 40 m$^2$/g, most preferably at least 50 m$^2$/g. The BET specific surface area of the hexagonal barium ferrite powder is preferably 1 to 100 m$^2$/g or more.

A binder to be contained in the primer layer or the magnetic layer may be a combination of a polyurethane resin and at least one resin selected from the group consisting of a vinyl chloride resin, a vinyl chloride-vinyl acetate copolymer resin, a vinyl chloride-vinyl alcohol copolymer resin, a vinyl chloride-vinyl acetate-vinyl alcohol copolymer resin, a vinyl chloride-vinyl acetate-maleic anhydride copolymer resin, a vinyl chloride-hydroxyl group-containing alkyl acrylate copolymer resin, nitrocellulose, and the like. Among them, a mixture of the vinyl chloride-hydroxyl group-containing alkyl acrylate copolymer resin and the polyurethane resin is preferably used. Examples of the polyurethane resin include polyesterpolyurethane, polyetherpolyurethane, polyetherpolyesterpolyurethane, polycarbonatepolyurethane, polyestrepolycarbonatepolyurethane, etc.

Preferably, a binder resin such as a polyurethane resin having COOH, SO$_3$M, OSO$_2$M, P=O(OM)$_3$, O—P=O (OM)$_2$ wherein M is a hydrogen atom, an alkali metal base or an amine salt, OH, NR$^1$R$^2$, N$^+$R$^3$R$^4$R$^5$ wherein R$^1$ to R5 are each a hydrogen atom or a hydrocarbon group, or an epoxy group as a functional group is used. The reason why such a binder is used is that the dispersibility of the magnetic powder, etc. is improved. When two or more resins are used in combination, the polarities of the functional groups of the resins are preferably the same. In particular, the combination of the resins having —SO$_3$M groups is preferable.

The binder is used in an amount of 7 to 50 parts by weight, preferably from 10 to 35 parts by weight, based on 100 parts by weight of the ferromagnetic powder. In particular, the combination of 5 to 30 parts by weight of the vinyl chloride base resin and 2 to 20 parts by weight of the polyurethane resin is preferably used.

It is preferable to use a thermally curable crosslinking agent, which bonds with the functional groups in the binder to crosslink the binder. As the crosslinking agent, polyisocyanates, for example, tolylene diisocyanate, hexamethylene diisocyanate, isophorone diisocyanate; reaction products of these isocyanates with compounds having plural hydroxyl groups such as trimethylolpropane; condensation products of these isocyanates, and the like are preferably used. The crosslinking agent is used in an amount of 10 to 50 parts by weight, preferably 10 to 35 parts by weight, based on 100 parts of the binder. When the amount of the crosslinking agent contained in the magnetic layer is about a half of that contained in the primer layer, the coefficient of friction of the magnetic layer against the slider of the MR head is preferably decreased. The reason why this range (30 to 60%) is preferable is that, when this ratio is less than 30%, the film strength of the magnetic layer may be decreased, while when this ratio exceeds 60%, the LRT treatment conditions should be made severe to decrease the coefficient of friction against the slider, which leads to the increase of costs.

The magnetic layer can contain conventional carbon black to improve the conductivity and the surface lubricity. As carbon black, acetylene black, furnace black, thermal black, etc. may be used. Carbon black having a particle size of 5 to 100 nm is generally used, and one having a particle size of 10 to 100 nm is preferably used. When the particle size of carbon black is less than 5 nm, the dispersion of carbon black particles is difficult. When the particle size of carbon black exceeds 100 nm, a large amount of carbon black should be added. In either case, the surface of the magnetic layer is roughened and thus the output may decrease.

The amount of carbon black is preferably from 0.2 to 5% by weight, more preferably from 0.5 to 4% by weight, particularly preferably from 0.5 to 3.5% by weight, most preferably from 0.5 to 3% by weight in the case of the ferromagnetic powder. When the amount of carbon black is less than 0.2% by weight, the effect of the addition of carbon black is insufficient. When the amount of carbon black exceeds 5% by weight, the surface of the magnetic layer tends to be roughened.

Backcoat Layer:

To improve the traveling properties, a conventional backcoat layer is used. The thickness of the backcoat layer is usually from 0.2 to 0.8 μm. When the thickness of the backcoat layer is less than 0.2 μm, the effect to improve the traveling properties is insufficient. When the thickness of the backcoat layer exceeds 0.8 μm, the total thickness of the magnetic tape increases so that the recording capacity of the tape per one reel decreases.

The coefficient of friction between the backcoat layer and SUS is preferably from 0.10 to 0.30, more preferably from 0.10 to 0.25. When this coefficient of friction is less than 0.10, the magnetic tape easily slips on the guide rollers so that the traveling of the tape becomes unstable. When this coefficient of friction exceeds 0.30, the guide rollers tend to be contaminated. A ratio of $\mu_{mSL}$ to $\mu_{BSUS}$ $[(\mu_{mSL})/(\mu_{BSUS})]$ is from 0.8 to 1.5, preferably from 0.9 to 1.4. Outside this range, the off-track of the magnetic tape due to meandering may be worsened.

As carbon black to be contained in the backcoat layer, acetylene black, furnace black, thermal black, etc. can be used. In general, carbon black with a small particle size and carbon black with a large particle size are used. The particle size of small particle size carbon black is usually from 5 to 100 nm, preferably from 10 to 100 nm. When the particle size of small particle size carbon black is less than 10 nm, the dispersion is difficult. When the particle size of small particle size carbon black exceeds 100 nm, a large amount of carbon black should be added. In either case, the surface of the backcoat layer is roughened and thus the surface roughness of the backcoat layer may be transferred to the magnetic layer (embossing).

When the large black carbon having a particle size of 300 to 400 nm is used in an amount of 5 to 15% by weight of the small particle size carbon black, the surface of the backcoat is not roughened and the effect to increase the traveling properties is increased. The total amount of small particle size carbon black and large particle size carbon black is preferably from 60 to 98% by weight, more preferably from 70 to 95% by weight, based on the weight of inorganic powders in the backcoat layer. The centerline average surface roughness Ra of the backcoat layer is preferably from 2 to 15 nm, more preferably from 3 to 8 nm.

To increase the strength of the backcoat layer, it is preferable to add iron oxide having a particle size of 0.1 to 0.6 μm, preferably 0.2 to 0.5 μm to the backcoat layer. The amount of the iron oxide is preferably from 2 to 40% by weight, more preferably from 5 to 30% by weight, based on the weight of inorganic powders in the backcoat layer.

The binders to be contained in the backcoat layer may be the same as those used in the magnetic layer and the primer layer. Among the binders, the combination of the cellulose resin and the polyurethane resin is preferably used to decrease the coefficient of friction and to improve the traveling properties.

The amount of the binder in the backcoat layer is usually from 40 to 150 parts by weight, preferably from 50 to 120 parts by weight, more preferably from 60 to 110 parts by weight, particularly preferably from 70 to 110 parts by weight, based on the total weight of carbon black and the inorganic powders in the backcoat layer. When the amount of the binder is less than 50 parts by weight, the strength of the backcoat layer is insufficient. When the amount of the binder exceeds 120 parts by weight, the coefficient of friction may become too large. Preferably, 30 to 70 parts by weight of the cellulose resin and 20 to 50 parts by weight of the polyurethane resin are used. To cure the binder, a crosslinking agent such as a polyisocyanate compound is preferably used.

The crosslinking agents to be contained in the backcoat layer may be the same as those used in the magnetic layer and the primer layer. The amount of the crosslinking agent is usually from 10 to 50 parts by weight, preferably from 10 to 35 parts by weight, more preferably from 10 to 30 parts by weight, based on 100 parts by weight of the binder. When the amount of the crosslinking agent is less than 10 parts by weight, the film strength of the backcoat layer tends to decrease. When the amount of the crosslinking agent exceeds 35 parts by weight, the coefficient of kinetic friction of the backcoat layer against SUS increases.

The special-purpose backcoat layer, in which the servo-signal is recorded, may contain 30 to 60 parts by weight of the ferromagnetic powder which is used in the magnetic layer, 40 to 70 parts by weight of carbon black to be used in the backcoat layer, and optionally 2 to 15 parts by weight of the iron oxide and/or alumina to be used in the backcoat layer. As the binder, the resin to be used in the backcoat layer is used in an amount of usually 40 to 150 parts by weight, preferably 50 to 120 parts by weight, based on 100 parts by weight of the total amount of the ferromagnetic powder, carbon black, the non-magnetic inorganic powder and the binder. As the crosslinking agent, the crosslinking agent described above is used in an amount of 10 to 50 parts by weight per 100 parts by weight of the binder. For the same reason as described with regard to the magnetic layer, preferably the coercive force is from 120 to 320 kA/m, and the product of the residual magnetic flux density Br and the thickness is from 0.018 to 0.06 $\mu$Tm.

LRT (Lapping/Rotary/Tissue) Treatment:

The LRT treatment will be explained by making reference to FIG. 1, in which numeral 1 stands for an unwinding roll for the magnetic tape 30, numeral 2 for feed rolls, numeral 3 for an abrasive tape (lapping tape), numeral 4 for a block for an abrasive tape, numeral 5 for a rotary roll for an abrasive tape, numeral 6 for a rotary wheel made of aluminum, numeral 7 for a rotary rod for pressing a non-woven fabric against the backcoat layer 31b of the magnetic tape 30, numeral 8 for a rotary rod for pressing a non-woven fabric against the magnetic layer 31a, numeral 9 for non-woven fabric (tissue), numeral 10 for a rotary roll for a non-woven fabric, numeral 11 for a feed roll, and numeral 12 for a winding roll.

(1) Lapping

As shown in FIG. 1, the abrasive tape (lapping tape) 3 travels with the rotary roll 5 at a constant rate (standard: 14.4 cm/min.) in a direction opposite to the traveling direction of the magnetic tape 30 (standard tape traveling rate: 400 m/min.), and is in contact with the magnetic layer 31a of the magnetic tape 30 while being pressed with the guide block 4 from the lower side in the figure. In this step, the magnetic layer is abraded with maintaining the unwinding tension of the magnetic tape and the tension of the abrasive tape 3 constant (standard: 100 g and 250 g, respectively). The abrasive tape (lapping tape) 3 used in this step may be a lapping tape with fine abrasive particles such as M20000, WA10000 or K10000. It may be possible to use an abrasive wheel (lapping wheel) in place of or in combination with the abrasive tape (lapping tape). When frequent replacement is necessary, the abrasive tape (lapping tape) 3 is used alone.

(2) Rotary Treatment

The rotary wheel 6 having air-bleeding grooves shown in FIG. 1 (manufactured by KYOWA SEIKO Co., Ltd.) (standard: width 1 inch (25.4 mm); diameter 60 mm$\phi$; width of air-bleeding grooves 2 mm; angle of groove 45 degrees) is rotated at a constant revolution rate (usually 200 to 3,000 rpm; standard: 1,100 rpm) in a direction opposite to the traveling direction of the magnetic tape (indicated by the arrows in the figure), and allowed to be in contact with the magnetic layer 30a of the magnetic tape 30 at a constant contact angle (standard: 90 degrees). Thus, the surface of the magnetic layer 30a is treated.

(3) Tissue Treatment

The tissue (a non-woven fabric, for example, Traysee manufactured by Toray) is traveled at a constant rate (standard: 14.0 mm/min.) in a direction opposite to the traveling direction of the magnetic tape 30 while pressing the rotary rods 7, 8 against the surface of the backcoat layer 31b and the surface of the magnetic layer 31a of the magnetic tape 30, respectively to clean the surfaces.

A cassette tape containing the magnetic tape of the present invention has a large capacity per one reel, and a low error rate since low PW50 and a high output can be achieved, when the MR reading head is used. Thus, it has high reliability when it is used for backup of a hard disc.

EXAMPLES

The present invention will be explained in detail with the following examples, which do not limit the scope of the invention in any way. In Examples and Comparative Examples, "parts" are "parts by weight".

Example 1

<Components of a paint for undercoat layer>

(1)

| | |
|---|---|
| Iron oxide powder (particle size: 0.11 × 0.02 $\mu$m) | 68 parts |
| $\alpha$-Alumina (particle size: 0.07 $\mu$m) | 8 parts |
| Carbon black (particle size: 25 nm; oil absorption: 55 g/cc) | 24 parts |
| Stearic acid | 2.0 parts |
| Vinyl chloride-hydroxypropyl acrylate copolymer (—SO$_3$Na group content: 0.7 × 10$^{-4}$ eq./g) | 8.8 parts |
| Polyesterpoyurethane resin (Tg: 40° C., —SO$_3$Na group content: 1 × 10$^{-4}$ eq./g) | 4.4 parts |
| Cyclohexanone | 25 parts |
| Methyl ethyl ketone | 40 parts |
| Toluene | 10 parts |

(2)

| | |
|---|---|
| Butyl stearate | 1 part |
| Cyclohexanone | 70 parts |
| Methyl ethyl ketone | 50 parts |
| Toluene | 20 parts |

(3)

| | |
|---|---|
| Polyisocyanate (Colonate L manufactured by Nippon Polyurethane) | 4.4 parts |
| Cyclohexanone | 10 parts |
| Methyl ethyl ketone | 15 parts |
| Toluene | 10 parts |

<Components of a paint for magnetic layer>

(A)

| | |
|---|---|
| Ferromagnetic iron metal powder (Co/Fe: 20 atomic %, Y/(Fe + Co): 3 atomic %, Al/(Fe + Co): 5 wt. %, Ca/Fe: 0 wt. %; $\sigma$s: 155 A · m$^2$/kg, Hc: 149.6 kA/m, pH: 9.4, major axis length: 0.10 $\mu$m) | 100 parts |
| Vinyl chloride-hydroxypropyl acrylate copolymer (—SO$_3$Na group content: 0.7 × 10$^{-4}$ eq./g) | 12.3 parts |
| Polyesterpoyurethane resin (—SO$_3$Na group content: 1 × 10$^{-4}$ eq./g) | 5.5 parts |
| $\alpha$-Alumina (particle size: 0.12 $\mu$m) | 8 parts |
| $\alpha$-Alumina (particle size: 0.07 $\mu$m) | 2 parts |
| Carbon black (particle size: 75 nm; oil absorption: 72 cc/100 g) | 1.0 part |
| Metal acid phosphate | 2 parts |
| Palmitic acid amide | 1.5 parts |
| n-Butyl stearate | 1.0 part |
| Tetrahydrofuran | 65 parts |
| Methyl ethyl ketone | 245 parts |
| Toluene | 85 parts |

(B)

| | |
|---|---|
| Polyisocyanate | 2.0 parts |
| Cyclohexanone | 167 parts |

A paint for primer layer was prepared by kneading the components of Group (1) with a kneader, adding the components of Group (2) to the mixture and mixing them, dispersing the mixed components with a sand mill at a residence time of 60 minutes, and adding the component of Group (3) followed by mixing and filtration.

Separately, a magnetic paint was prepared by kneading the components of Group (A) with a kneader, dispersing the mixture with a sand mill at a residence time of 45 minutes, and adding the components of Group (B) followed by mixing and filtration.

The paint for primer layer was applied on a support made of a polyethylene naphthalate film (thickness of 6.2 µm, MD=6.08 GPa, MD/TD=1.3; manufactured by TEIJIN) so that the dry thickness after drying and calendering was 1.8 µm, and then the paint for magnetic layer was applied on the primer layer by a wet-on-wet method so that the dry thickness after orientation with a magnetic field, drying and calendering was 0.15 µm. After orientation with the magnetic field, the layers were dried with a drier to obtain a magnetic sheet. The orientation with the magnetic field was carried out by providing N—N opposed magnets (5 kG) upstream the drier and two pairs of N—N opposed magnets (5 kG) from a distance of 75 cm upstream the finger-touch drying position in the drier with separating two pairs of the magnets by 50 cm. The coating rate was 100 m/min.

| <Components of a paint for backcoat layer> | |
|---|---|
| Carbon black (particle size: 25 nm) | 80 parts |
| Carbon black (particle size: 370 nm) | 10 parts |
| Iron oxide (major axis length: 0.4 µm; acicular ratio: about 10) | 10 parts |
| Nitrocellulose | 45 parts |
| Polyurethane resin (containing SO$_3$Na groups) | 30 parts |
| Cyclohexanone | 260 parts |
| Toluene | 260 parts |
| Methyl ethyl ketone | 525 parts |

The components of a paint for backcoat layer were dispersed with a sand mill at a residence time of 45 minutes and a polyisocyanate (15 parts) was added to the mixture to obtain a paint for backcoat layer. After filtration, the paint was coated on the surface of the magnetic sheet opposite to the magnetic layer so that the dry thickness after drying and calendering was 0.5 µm, and then dried.

The magnetic sheet obtained was planished with seven-stage calendering using metal rolls at a temperature of 100° C. and a linear pressure of 150 kg/cm, and aged at 70° C. for 72 hours with the magnetic sheet being wound around a core. Then, the magnetic sheet was cut to a ½ width and subjected to the LRT treatment under the following conditions. The magnetic tape obtained was installed in a cartridge to obtain a magnetic tape for computer.

The backcoat layer had Ra of 8 nm.
<LRT (Lapping/Rotary/Tissue) Treatment>
(1) Lapping As shown in FIG. 1, the abrasive tape (lapping tape) 3 was traveled with the rotary roll 5 at a rate of 14.4 cm/min. in a direction opposite to the traveling direction of the magnetic tape 30 (magnetic tape traveling rate: 400 m/min.), and was in contact with the magnetic layer 30a of the magnetic tape 30 with being pressed with the guide block 4 from the lower side in the figure. In this step, the magnetic layer was abraded with maintaining the unwinding tension of the magnetic tape at 100 g and the tension of the abrasive tape 3 at 250 g.

(2) Rotary Treatment

The aluminum rotary wheel 6 having air-bleeding grooves with a width of 2 mm shown in FIG. 1 (manufactured by KYOWA SEIKO Co., Ltd.; angle of groove 45 degrees), which had a width of 25.4 mm and a diameter of 60 mm, was rotated at a revolution rate of 1,100 rpm in a direction opposite to the traveling direction of the magnetic tape and allowed to be in contact with the magnetic layer 30a of the magnetic tape 30 at a contact angle of 90 degrees. Thus, the surface of the magnetic layer 30a was treated.

(3) Tissue Treatment

The tissue 9 (a non-woven fabric: Traysee manufactured by Toray) was traveled at a rate of 14.0 mm/min. in a direction opposite to the traveling direction of the magnetic tape 30 while pressing the tissue with the rotary rods 7, 9 against the surface of the backcoat layer 30b and the surface of the magnetic layer 30a of the magnetic tape 30, respectively to clean the surfaces.

Examples 2–10

A magnetic tape for computer was produced in the same manner as in Example 1 except that a part of the conditions were changed as shown in Tables 1, 2 and 3.

Comparative Example 1

A magnetic tape for computer was produced in the same manner as in Example 1 except that no LRT treatment was carried out.

Comparative Example 2

A magnetic tape for computer was produced in the same manner as in Example 1 except that the following LBT treatment was carried out in place of the LRT treatment:

<LBT Treatment>

The surface of the magnetic layer was abraded with a lapping tape and a blade and then wiped while the magnetic tape was traveled at a rate of 400 m/min. to obtain the magnetic tape. In this step, the K10000 tape was used as the lapping tape (abrasive tape), a carbide-tipped blade was used as the blade, and Toray's Toraysee was used for wiping the surface. The traveling tension was 30 g.

The magnetic tape obtained was installed in a cartridge to obtain a magnetic tape for computer.

Comparative Example 3

A magnetic tape for computer was produced in the same manner as in Comparative Example 2 except that the LBT treatment was repeated ten times.

Comparative Examples 4–6

A magnetic tape for computer was produced in the same manner as in Comparative Example 2 except that a part of the conditions were changed as shown in Table 5.

The Properties were Evaluated as Follows:

<Measurement of PW50, Reading Output and Error Rate>

The PW50, reading output and error rate (ERT) were measured by recording and reading information (recording wavelength: 0.55 µm) using a LTO drive, which was remodeled so that it could measure the properties of thin tapes The PW 50 was reported as a relative value with that of the tape of Comparative Example 1 being 1 (one), the reading output was reported as a relative value with that of the tape of Comparative Example 1 being 0 dB, and the degradation of output was an output of the magnetic tape after recording and reading 10 times with the initial output being 0 dB.

<Surface Roughness, Median of Projections and Projection Height of Magnetic Layer>

The measurement was carried out by a scanning type white-light interference method with a scanning length of 5 µm using a general-purpose three-dimensional surface structure analyzer (New Veiw 5000 manufactured by ZYGO). The field of view was 350 µm×260 µm.

$(P_1-P_0)$, $(P_1-P_{20})$ and $[(P_1-P_0)/Ra]$ were calculated, wherein Ra is a centerline average surface roughness of the magnetic layer, $P_0$ is an averaged height of projections of the magnetic layer, and $P_1, P_2, P_3, P_4, P_5$ - - - and $P_{20}$ are heights of the second highest, the third highest, the fourth highest, the fifth highest, - - - and the 20th highest projections of the magnetic layer, respectively.

<Protruded Distance and Abraded Amount of MR Head>

The field of view of 80 µm×80 µm was observed with a scanning type probe microscope (Nano Scopea/Dimension-3100 manufactured by Digital Instrument; trapping mode AFM). After compensating the slope, noise, etc., the profile of the cross section was analyzed, and the protruded distance and the abraded amount of the MR head before and after traveling the magnetic tape were measured.

<Coefficients of Friction of Magnetic Layer Against Slider Material and SUS>

Against SUS:

Around a SUS pin (SUS 304) having an outer diameter of 5 mm, a magnetic tape was wound at an angle of 90 degrees with a load of 0.64 N. The same part of the tape was slid at a rate of 20 mm/sec. ten times, and then a coefficient of friction was measured.

Against Slider Material:

Around an AlTiC pin having an outer diameter of 7 mm, a magnetic tape was wound at an angle of 90 degrees with a load of 0.64 N. The same part of the tape was slid at a rate of 20 mm/sec. ten times, and then a coefficient of friction was measured.

<Young's Moduli (MD and TD) of Non-magnetic Support>

Using a small-size tensile tester (manufactured by YOKOHAMA SYSTEM Co., Ltd.), a strain and tensile strength of a support were measured at 23° and 50% RH. The length of the test sample of the support was 10 mm, and the sample was pulled at a rate of 10% strain per minute, and a tensile modulus at 0.3% elongation was evaluated based on the strength at 0.3% strain. This measurement was carried out in the machine and transverse directions of the support.

The results of the above measurements are shown in Tables 1 to 5. The meanings of abbreviations used in the Tables are as follows:

$\mu_{mSL}$: a coefficient of friction between a magnetic layer and a slider material.

$\mu_{mSUS}$: a coefficient of friction between a magnetic layer and SUS.

$\mu_{BSUS}$: a coefficient of friction between a backcoat layer and SUS.

Brδ: a product of a residual magnetic flux density (Br) and a thickness of a magnetic layer (δ).

Hc: a coercive force of a magnetic layer.

BC: a backcoat layer.

CB: carbon black.

MD/TD: a ratio of a Young's modulus in a machine direction (MD) to that in a transverse direction (TD) of a non-magnetic support. Surface roughness Ra of a magnetic layer: a centerline surface roughness Ra of a magnetic layer.

TABLE 1

|  | Example 1 | Example 2 | Example 3 |
| --- | --- | --- | --- |
| Thickness of magnetic layer (µm) | 0.15 | 0.15 | 0.10 |
| Brδ (µTm) | 0.045 | 0.045 | 0.030 |
| Hc (kA/m) | 157 | 157 | 157 |
| Magnetic layer |  |  |  |
| Major axis length of magnetic powder (µm) | 0.10 | 0.10 | 0.10 |
| Palmitic acid amide (parts) | 1.5 | 1.5 | 1.5 |
| Stearic acid amide (parts) | 0 | 0 | 0 |
| n-Butyl stearate (parts) | 1.0 | 1.0 | 1.0 |
| Polyisocyanate (parts) | 2.0 | 2.0 | 2.0 |
| Thickness of primer layer (µm) | 1.8 | 1.8 | 1.1 |
| Nonmagnetic support |  |  |  |
| Material | PEN | PEN | Aramid |
| Thickness (µm) | 6.2 | 6.2 | 3.9 |
| TD (GPa) | 6.08 | 6.08 | 12.0 |
| MD/TD | 1.3 | 1.3 | 1.4 |
| Thickness of BC (µm) | 0.5 | 0.5 | 0.5 |
| Small size CB (nm, parts) | 25, 50 | 25, 50 | 25, 50 |
| Large size CB (nm, parts) | 370, 10 | 370, 10 | 370, 10 |
| Total thickness (µm) | 8.65 | 8.65 | 5.6 |
| Magnetic tape capacity (GB) | about 200 | about 200 | about 400 |
| LRT treatment conditions |  |  |  |
| Forwarding Rate of magnetic tape (m/min) | 400 | 400 | 400 |
| Traveling Rate of abrasive tape (cm/min) | 14.4 | 14.4 | 14.4 |
| Tension of magnetic tape (g) | 100 | 100 | 100 |
| Tension of abrasive tape (g) | 250 | 250 | 250 |
| Rotary wheel, Material | Aluminum | Aluminum | Aluminum |
| Ra (µm) | 0.01 | 0.01 | 0.01 |

TABLE 1-continued

|  | Example 1 | Example 2 | Example 3 |
|---|---|---|---|
| Radius (mm), Rotation Rate (rpm) | 60, 1100 | 60, 1100 | 60, 1100 |
| Traveling Rate of tissue (mm/min) | 14.0 | 14.0 | 14.0 |
| No. of LRT treatment (times) | 1 | 10 | 1 |
| Surface roughness of magnetic layer | | | |
| Ra (nm) | 3.1 | 2.5 | 3.2 |
| $(P_1-P_0)$ (nm) | 27.7 | 20.1 | 29.9 |
| $(P_1-P_{20})$ (nm) | 1.5 | 0.9 | 1.8 |
| $\mu_{mSUS}$ | 0.20 | 0.21 | 0.21 |
| $(\mu_{mSL})/(\mu_{mSUS})$ | 1.1 | 1.2 | 1.1 |
| $(\mu_{mSL})/(\mu_{BSUS})$ | 1.2 | 1.4 | 1.3 |
| $(P_1-P_0)/Ra$ | 8.9 | 8.0 | 9.3 |
| PW 50 in 1st traveling (relative) | 0.8 | 0.7 | 0.65 |
| Read output in 1st traveling (dB) | +2.5 | 3.0 | 3.0 |
| Error rate in 1st traveling (ERT) ($10^{-7}$) | 0.1 | 0.08 | 0.2 |
| Off-track (%) | 0.08 | 0.09 | 0.12 |
| Read output after 100 travelings (dB) | −0.2 | −0.0 | +0.0 |
| ERT after 100 travelings ($10^{-7}$) | 0.09 | 0.08 | 0.12 |
| Abraded amount of MR head after 100 travelings (nm) | 10 | 4 | 13 |

TABLE 2

|  | Example 4 | Example 5 | Example 6 |
|---|---|---|---|
| Thickness of magnetic layer (μm) | 0.10 | 0.15 | 0.10 |
| Brδ (μTm) | 0.030 | 0.045 | 0.030 |
| Hc (kA/m) | 157 | 140 | 192 |
| Magnetic layer | | | |
| Major axis length of magnetic powder (μm) | 0.10 | 0.15 | 0.07 |
| Palmitic acid amide (parts) | 1.5 | 0 | 1.5 |
| Stearic acid amide (parts) | 0 | 0 | 0 |
| n-Butyl stearate (parts) | 1.0 | 2.0 | 1.0 |
| Polyisocyanate (parts) | 2.0 | 4.4 | 2.0 |
| Thickness of primer layer (μm) | 1.3 | 1.8 | 1.3 |
| Nonmagnetic support | | | |
| Material | Aramide | PEN | Aramide |
| Thickness (μm) | 4.2 | 6.2 | 3.9 |
| TD (GPa) | 12.0> | 6.08 | 12.0 |
| MD/TD | 1.4 | 1.3 | 1.4 |
| Thickness of BC (μm) | 0.5 | 0.5 | 0.5 |
| Small size CB (nm, parts) | 25, 50 | 25, 50 | 25, 50 |
| Large size CB (nm, parts) | 370, 10 | 370, 10 | 370, 10 |
| Total thickness (μm) | 6.1 | 8.65 | 5.8 |
| Magnetic tape capacity (GB) | about 400 | about 200 | about 400 |
| LRT treatment conditions | | | |
| Forwarding Rate of magnetic tape (m/min) | 400 | 100 | 200 |
| Traveling Rate of abrasive tape (cm/min) | 14.4 | 14.4 | 14.4 |
| Tension of magnetic tape (g) | 100 | 100 | 100 |
| Tension of abrasive tape (g) | 250 | 250 | 250 |
| Rotary wheel, Material | AlTiC | Aluminum | AlTiC |
| Ra (μm) | 0.01 | 0.01 | 0.005 |
| Radius (mm), Rotation Rate (rpm) | 60, 1100 | 60, 1100 | 60, 2200 |
| Traveling Rate of tissue (mm/min) | 14.0 | 14.0 | 14.0 |
| No. of LRT treatment (times) | 1 | 3 | 1 |
| Surface roughness of magnetic layer | | | |
| Ra (nm) | 2.7 | 2.8 | 1.8 |
| $(P_1-P_0)$ (nm) | 25.9 | 22.2 | 10.8 |
| $(P_1-P_{20})$ (nm) | 1.3 | 1.0 | 0.6 |
| $\mu_{mSUS}$ | 0.22 | 0.25 | 0.20 |
| $(\mu_{mSL})/(\mu_{mSUS})$ | 0.8 | 1.1 | 1.0 |
| $(\mu_{mSL})/(\mu_{BSUS})$ | 1.0 | 1.5 | 1.1 |
| $(P_1-P_0)/Ra$ | 9.6 | 7.9 | 6.0 |
| PW 50 in 1st traveling (relative) | 0.7 | 0.8 | 0.6 |
| Read output in 1st traveling (dB) | 3.2 | 2.9 | 3.9 |
| Error rate in 1st traveling (ERT) ($10^{-7}$) | 0.1 | 0.09 | 0.08 |

TABLE 2-continued

|  | Example 4 | Example 5 | Example 6 |
|---|---|---|---|
| Off-track (%) | 0.06 | 0.09 | 0.02 |
| Read output after 100 travelings (dB) | −0.1 | +1.2 | −0.2 |
| ERT after 100 travelings ($10^{-7}$) | 0.1 | 0.2 | <0.1 |
| Abraded amount of MR head after 100 travelings (nm) | 8 | 5 | 7 |

TABLE 3

|  | Example 7 | Example 8 | Example 9 | Example 10 |
|---|---|---|---|---|
| Thickness of magnetic layer (μm) | 0.10 | 0.10 | 0.10 | 0.15 |
| Brδ (μTm) | 0.03 | 0.030 | 0.030 | 0.045 |
| Hc (kA/m) | 192 | 192 | 192 | 157 |
| Magnetic layer |  |  |  |  |
| Major axis length of magnetic powder (μm) | 0.07 | 0.07 | 0.07 | 0.10 |
| Palmitic acid amide (parts) | 1.5 | 1.5 | 1.5 | 1.5 |
| Stearic acid amide (parts) | 0 | 0 | 0 | 0 |
| n-Butyl stearate (parts) | 1.2 | 1.2 | 1.2 | 1.0 |
| Polyisocyanate (parts) | 2.0 | 2.0 | 2.0 | 2.0 |
| Thickness of primer layer (μm) | 1.3 | 1.3 | 1.3 | 1.8 |
| Nonmagnetic support |  |  |  |  |
| Material | Aramid | Aramid | Aramid | PEN |
| Thickness (μm) | 3.9 | 3.9 | 3.9 | 6.2 |
| TD (GPa) | 12.0 | 12.0 | 12.0 | 6.08 |
| MD/TD | 1.4 | 1.4 | 1.4 | 1.3 |
| Thickness of BC (μm) | 0.5 | 0.5 | 0.5 | 0.5 |
| Small size CB (nm, parts) | 25, 50 | 25, 50 | 5, 50 | 25, 50 |
| Large size CB (nm, parts) | 370, 10 | 370, 10 | 370, 10 | 370, 10 |
| Calendering condition: Temp. (° C.) | 110 | 100 | 100 |  |
| Linear pressure (kg/cm) | 200 | 200 | 200 |  |
| Total thickness (μm) | 5.6 | 5.6 | 5.6 | 8.65 |
| Magnetic tape capacity (GB) | 400 | 400 | 400 | about 200 |
| LRT treatment conditions |  |  |  |  |
| Forwarding Rate of magnetic tape (m/min) | 100 | 100 | 100 | 400 |
| Traveling Rate of abrasive tape (cm/min) | 14.4 | 14.4 | 14.4 | 14.4 |
| Tension of magnetic tape (g) | 100 | 100 | 100 | 100 |
| Tension of abrasive tape (g) | 250 | 250 | 250 | 250 |
| Rotary wheel, Material | Al | AlTiC, | AlTiC | Al |
| Ra (μm) | 0.003 | 0.005 | 0.005 | 0.02 |
| Radius (mm), Rotation Rate (rpm) | 60, 1100 | 60, 1100 | 60, 1100 | 60, 1100 |
| Traveling Rate of tissue (mm/min) | 14.0 | 14.0 | 14.0 | 14.0 |
| No. of LRT treatment (times) | 3 | 3 | 5 | 1 |
| Surface roughness of magnetic layer |  |  |  |  |
| Ra (nm) | 0.5 | 0.6 | 0.7 | 3.0 |
| $(P_1-P_0)$ (nm) | 5.1 | 5.0 | 5.2 | 29.9 |
| $(P_1-P_{20})$ (nm) | 0.6 | 0.5 | 0.4 | 5.0 |
| $\mu_{mSUS}$ | 0.22 | 0.23 | 0.23 | 0.20 |
| $(\mu_{mSL})/(\mu_{mSUS})$ | 1.2 | 1.1 | 1.0 | 1.1 |
| $(\mu_{mSL})/(\mu_{BSUS})$ | 1.3 | 1.2 | 1.1 | 1.2 |
| $(P_1-P_0)/Ra$ | 10.2 | 8.3 | 8.6 | 10 |
| PW 50 in 1st traveling (relative) | 0.3 | 0.2 | 0.1 | 0.85 |
| Read output in 1st traveling (dB) | +4.1 | +4.3 | +4.5 | +1.5 |
| Error rate in 1st traveling (ERT) ($10^{-7}$) | 0.05 | 0.03 | 0.01 | 3.0 |
| Off-track (%) | 0.02 | 0.01 | 0.01 | 0.08 |
| Read output after 100 travelings (dB) | −0.2 | −0.1 | +0.0 | −1.0 |
| ERT after 100 travelings ($10^{-7}$) | 0.1 | 0.05 | 0.02 | 5.0 |
| Abraded amount of MR head after 100 travelings (nm) | 3 | 2 | 1 | 10 |

TABLE 4

|  | C. Ex. 1 | C. Ex. 2 | C. Ex. 3 |
|---|---|---|---|
| Thickness of magnetic layer (μm) | 0.15 | 0.15 | 0.15 |
| Brδ (μTm) | 0.045 | 0.045 | 0.045 |
| Hc (kA/m) | 157 | 157 | 157 |
| Magnetic layer |  |  |  |
| Major axis length of magnetic powder (μm) | 0.10 | 0.10 | 0.10 |
| Palmitic acid amide (parts) | 1.5 | 1.5 | 1.5 |
| Stearic acid amide (parts) | 0 | 0 | 0 |
| n-Butyl stearate (parts) | 1.0 | 1.0 | 1.0 |
| Polyisocyanate (parts) | 2.0 | 2.0 | 2.0 |
| Thickness of primer layer (μm) | 1.8 | 1.8 | 1.8 |
| Nonmagnetic support |  |  |  |
| Material | PEN | PEN | Aramid |
| Thickness (μm) | 6.2 | 6.2 | 3.9 |
| TD (GPa) | 6.08 | 6.08 | 12.0 |
| MD/TD | 1.3 | 1.3 | 1.4 |
| Thickness of BC (μm) | 0.5 | 0.5 | 0.5 |
| Small size CB (nm, parts) | 25, 50 | 25, 50 | 25, 50 |
| Large size CB (nm, parts) | 370, 10 | 370, 10 | 370, 10 |
| Total thickness (μm) | 8.65 | 8.65 | 5.6 |
| Magnetic tape capacity (GB) | about 200 | about 200 | about 400 |
| LRT treatment conditions |  |  |  |
| Forwarding Rate of magnetic tape (m/min) | No LRT treatment | 400 | 400 |
| Traveling Rate of abrasive tape (cm/min) |  | 14.4 | 14.4 |
| Tension of magnetic tape (g) |  | 100 | 100 |
| Tension of abrasive tape (g) |  | 250 | 250 |
| Rotary wheel, Material |  | Blade treatment | Blade treatment |
| Ra (μm) |  |  |  |
| Radius (mm), Rotation Rate (rpm) |  |  |  |
| Traveling Rate of tissue (mm/min) |  | 14.0 | 14.0 |
| No. of LRT treatment (times) |  | 1 | 1 |
| Surface roughness of magnetic layer |  |  |  |
| Ra (nm) | 4.5 | 3.9 | 3.7 |
| $(P_1-P_0)$ (nm) | 55.1 | 42.5 | 38.2 |
| $(P_1-P_{20})$ (nm) | 8.5 | 5.1 | 4.5 |
| $\mu_{mSUS}$ | 0.32 | 0.31 | 0.30 |
| $(\mu_{mSL})/(\mu_{mSUS})$ | 1.8 | 1.6 | 1.4 |
| $(\mu_{mSL})/(\mu_{BSUS})$ | 3.2 | 2.8 | 2.3 |
| $(P_1-P_0)/Ra$ | 12.2 | 10.9 | 10.3 |
| PW 50 in 1st traveling (relative) | 1.0 | 0.95 | 1.2 |
| Read output in 1st traveling (dB) | 0.0 | 0.2 | 0.5 |
| Error rate in 1st traveling (ERT) ($10^{-7}$) | 50 | 35 | 21 |
| Off-track (%) | 0.20 | 0.17 | 0.15 |
| Read output after 100 travelings (dB) | −3.0 | −2.4 | −2.2 |
| ERT after 100 travelings ($10^{-7}$) | 100 | 65 | 42 |
| Abraded amount of MR head after 100 travelings (nm) | 25 | 20 | 16 |

TABLE 5

|  | C. Ex. 4 | C. Ex. 5 | C. Ex. 6 |
|---|---|---|---|
| Thickness of magnetic layer (μm) | 0.15 | 0.15 | 0.15 |
| Brδ (μTm) | 0.045 | 0.045 | 0.045 |
| Hc (kA/m) | 157 | 157 | 157 |
| Magnetic layer |  |  |  |
| Major axis length of magnetic powder (μm) | 0.10 | 0.10 | 0.10 |
| Palmitic acid amide (parts) | 1.5 | 1.5 | 1.5 |
| Stearic acid amide (parts) | 0 | 0 | 0 |
| n-Butyl stearate (parts) | 1.0 | 1.0 | 1.0 |
| Polyisocyanate (parts) | 2.0 | 2.0 | 2.0 |
| Thickness of primer layer (μm) | 1.8 | 1.8 | 1.8 |
| Nonmagnetic support |  |  |  |
| Material | PEN | PEN | PEN |
| Thickness (μm) | 6.2 | 6.2 | 6.2 |
| TD (GPa) | 6.08 | 6.08 | 6.08 |
| MD/TD | 1.3 | 1.3 | 1.3 |
| Thickness of BC (μm) | 0.5 | 0.5 | 0.5 |
| Small size CB (nm, parts) | 25, 50 | 25, 50 | 25, 50 |
| Large size CB (nm, parts) | 370, 10 | 370, 10 | 370, 10 |
| Calendering condition: Temp. (° C.) | 70 | 80 | 80 |
| Linear pressure (kg/cm) | 150 | 150 | 150 |
| Total thickness (μm) | 8.65 | 8.65 | 8.65 |
| Magnetic tape capacity (GB) | about 200 | about 200 | about 200 |
| LRT treatment conditions |  |  |  |
| Forwarding Rate of magnetic tape (m/min) | 400 | 400 | 400 |
| Traveling Rate of abrasive tape (cm/min) | 14.4 | 14.4 | 14.4 |
| Tension of magnetic tape (g) | 100 | 100 | 100 |
| Tension of abrasive tape (g) | 250 | 250 | 250 |
| Rotary wheel, Material | LBT treatment | LBT treatment | LBT treatment |
| Ra (μm) |  |  |  |
| Radius (mm), Rotation Rate (rpm) |  |  |  |
| Traveling Rate of tissue (mm/min) | 14.0 | 14.0 | 14.0 |
| No. of LRT treatment (times) | 15 | 15 | 20 |
| Surface roughness of magnetic layer |  |  |  |
| Ra (nm) | 3.3 | 3.1 | 2.5 |
| $(P_1-P_0)$ (nm) | 27 | 31 | 21 |
| $(P_1-P_{20})$ (nm) | 3.0 | 3.5 | 5.2 |
| $\mu_{mSUS}$ | 0.23 | 0.24 | 0.25 |
| $(\mu_{mSL})/(\mu_{mSUS})$ | 1.2 | 1.3 | 1.4 |
| $(\mu_{mSL})/(\mu_{BSUS})$ | 1.5 | 1.6 | 1.8 |
| $(P_1-P_0)/Ra$ | 8.2 | 10.0 | 8.4 |
| PW 50 in 1st traveling (relative) | 0.8 | 0.9 | 1.0 |
| Read output in 1st traveling (dB) | +2.0 | +1.7 | +1.5 |
| Error rate in 1st traveling (ERT) ($10^{-7}$) | 6 | 8 | 10 |
| Off-track (%) | 0.10 | 0.11 | 0.12 |
| Read output after 100 travelings (dB) | −0.6 | −0.8 | −1.0 |
| ERT after 100 travelings ($10^{-7}$) | 9 | 10 | 12 |
| Abraded amount of MR head after 100 travelings (nm) | 12 | 13 | 15 |

As can be seen from the results of Examples 1–10 and Comparative Examples 1–6 in Tables 1 to 5, the magnetic recording medium is excellent in error rates, when the medium comprises a non-magnetic support, a primer layer, a magnetic layer and a backcoat layer, wherein the magnetic layer has a thickness of 0.30 μm or less and a centerline average surface roughness Ra of 3.2 nm or less, and $(P_1-P_0)$ is 30 nm or less and $(P_1-P_{20})$ is 5 nm or less in which $P_0$ is an averaged height of projections of the magnetic layer, and $P_1$ and $P_{20}$ are heights of the highest and the 20th highest projections of the magnetic layer, respectively. Furthermore, the magnetic recording medium has small off-track, when a ratio of $\mu_{mSL}$ to $\mu_{mSUS}$ $[(\mu_{mSL})/(\mu_{mSUS})]$ is from 0.7 to 1.3 and a ratio of $\mu_{mSL}$ to $\mu_{BSUS}$ $[(\mu_{mSL})/(\mu_{BSUS})]$ is from 0.8 to 1.5, wherein $\mu_{mSL}$ is a coefficient of friction between the magnetic layer and a slider material, $\mu_{mSUS}$ is a coefficient of friction between the magnetic layer and SUS, and $\mu_{BSUS}$ is a coefficient of friction between the backcoat layer and SUS.

What is claimed is:

1. A magnetic recording medium comprising a non-magnetic support, at least one primer layer formed on one surface of the non-magnetic support, a magnetic layer formed on the primer layer, and a backcoat layer formed on the other surface of the non-magnetic support, wherein a centerline average surface roughness Ra of the backcoat layer is 2 to 15 μm, the non-magnetic support has a thickness of 2.0 μm to 7.0 μm, the magnetic layer has a thickness of 0.30 μm or less, and $(P_1-P_0)$ is 30 nm or less and $(P_1-P_{20})$ is 5 nm or less in which $P_0$ is an averaged height of projections of the magnetic layer, and $P_1, P_2, ---$ and $P_{20}$ are heights of the highest, the second highest, - - - and the 20th highest projections of the magnetic layer, respectively, when they are measured in a field of view of 350 µm×260 µm on the magnetic layer.

2. The magnetic recording medium according to claim 1, wherein $(P_1-P_0)$ is from 5 nm to 30 nm.

3. The magnetic recording medium according to claim 1, which is recorded and read with a reading head comprising a magnetoresistance effect element.

4. The magnetic recording medium according to claim 1, wherein said magnetic layer has a coercive force of 120 to 320 kA/m, and a product of a residual magnetic flux density in the machine direction of said magnetic layer and a thickness of said magnetic layer is from 0.0018 µTm to 0.06 µTm.

5. The magnetic recording medium according to claim 1, wherein said non-magnetic support has a Young's modulus in a machine direction of at least 6.08 GPa (at least 600 kg/mm2), and a ratio of a Young's modulus MD in the machine direction to a Young's modulus TD in a transverse direction (MD/TD) is from 0.6 to 1.8.

* * * * *

UNITED STATES PATENT AND TRADEMARK OFFICE
CERTIFICATE OF CORRECTION

PATENT NO. : 6,926,976 B2 Page 1 of 1
APPLICATION NO. : 10/725471
DATED : August 9, 2005
INVENTOR(S) : Masakazu Tani et al.

It is certified that error appears in the above-identified patent and that said Letters Patent is hereby corrected as shown below:

Claim 1, column 24, line 64:
"2 to 15 µm," should read as --2 to 15 nm,--

Signed and Sealed this

Third Day of April, 2007

JON W. DUDAS
*Director of the United States Patent and Trademark Office*